UNITED STATES PATENT OFFICE 2,491,639

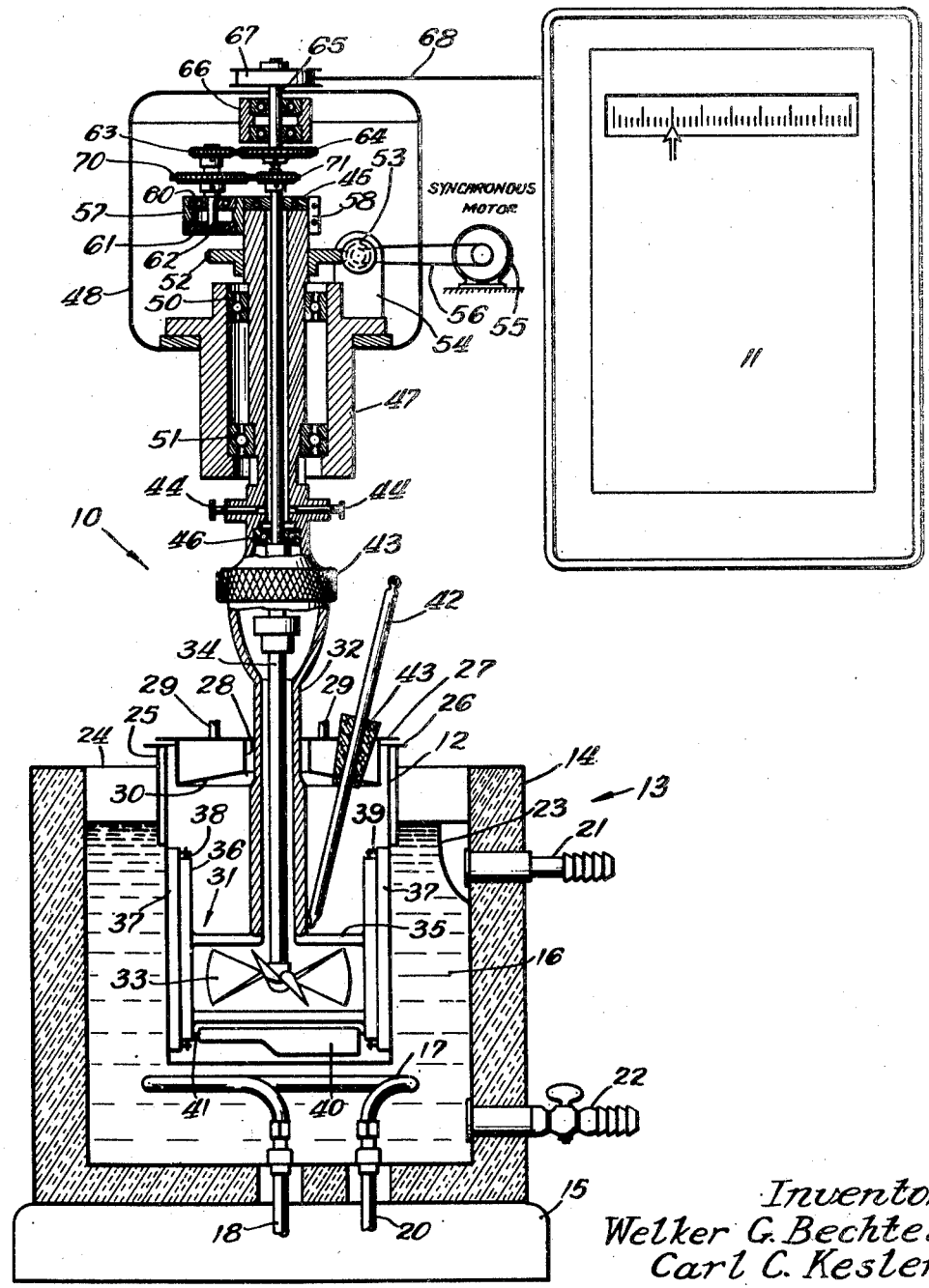

VISCOMETER

Welker G. Bechtel and Carl C. Kesler, Cedar Rapids, Iowa, assignors to Corn Industries Research Foundation, New York, N. Y., a corporation of Indiana Application January 9, 1948, Serial No. 1,356

5 Claims. (Cl. 73—59)

This invention relates, generally, to viscometers, and it has particular relation to continuous reading viscometers, particularly useful for measuring the viscosities of cooked aqueous dispersions of starch or its modifications.

Although the invention is particularly useful in connection with determining viscosities of aqueous starch dispersions, and will be described with specific relation thereto, it will be understood that the invention may also be used in connection with the determination and measurement of viscosities of other liquid masses.

Cooked aqueous dispersions of starch consist of swollen granules, fragments formed by disintegration of granules, and dissolved matter which has been leached from the swollen granules. Such dispersions of starch are known as starch pastes. Since starch pastes are not true solutions they do not have Newtonian flow properties. That is, they do not follow the laws of viscous flow which have been developed for pure liquids and true solutions. In particular the viscosities of starch pastes are not constant for all rates of shear, but are shear-dependent viscosities. Such shear-dependent viscosities are frequently distinguished from the property of true viscosity by referring to them as apparent viscosities or consistencies.

The apparent viscosity of starch pastes has long been used as a means of factory control of the process of modifying starches chemically, and for the specification and standardization of starch products of different commercial grades. Consumers of starch and its chemical and physical modifications have likewise used tests of apparent viscosity to determine the suitability of the properties of starches for certain specific uses.

Determinations of the apparent viscosity of starch pastes have been made in viscometers of many kinds. For pastes in the concentration range approximating that of common industrial uses, apparent viscosity has been determined most frequently in orifice viscometers such as the Scott, or by means of pipettes such as the Dudley. In other instances falling ball, rotational, or capillary viscometers have been used.

The apparent viscosity of dispersions such as starch pastes depends on the history of the sample prior to the test. The rate of cooking the sample, the temperature to which it is cooked, the rate and type of stirring, the length of the cooking period, and the total elapsed time from the start of cooking until the viscosity test is made all have an effect on the results of the test. These factors must be controlled with great precision in order for replicate tests to produce results which are in close agreement. In addition, precautions must be taken to prevent loss of water due to evaporation during cooking, for this will alter the concentration of the paste.

It has been difficult to make precise and reliable measurements of the apparent viscosity of starch pastes when rate of heating, final paste temperature, and time of cooking are controlled by the operator and stirring is done manually. For with such methods there are variations of experimental conditions from one test to another. This has frequently led to a lack of close agreement in replicate tests.

Furthermore, the apparent viscosity of materials such as starch pastes depends on the rate of shear employed in the viscometer. The greater the rate of shear the lower is the value obtained for the apparent viscosity. For this reason results of viscosity tests will give accurate values for direct comparison of products only when all tests are conducted at the same rate of shear. In any efflux viscometer, such as an orifice viscometer, rate of shear varies with the rate of flow of the fluid and thus varies with the viscosity of the starch paste. Pastes of higher viscosity are tested in such viscometers at lower rates of shear than are those of lower viscosity.

An additional limitation of such methods for testing starch pastes is that only a single test of apparent viscosity after an arbitrary period of cooking can conveniently be made. Since the viscosity of a starch paste generally changes continuously with cooking and agitation, such a single test is inadequate to characterize the flow properties of the material.

More recently there has been developed a type of viscometer in which viscosity is determined continuously during the cooking of the paste and the result is either indicated on a scale or recorded automatically on a chart. Among the difficulties which have heretofore limited the application of such viscometers are: (1) lack of sensitivity in the range of low viscosities, or lack of sufficient range to enable tests to be made over the range of viscosities required for industrial testing; (2) excessive evaporation of water from the paste during the cooking period, especially if tests are conducted for a long period of time; (3) non-uniform temperature throughout the entire quantity of paste due to the methods employed in heating and stirring the paste; and (4) non-uniform dispersion of the starch solids with tendency for them to thicken and adhere to the container surfaces.

A primary object of the invention is the provision of a unit for use in viscosity measuring apparatus which unit insures that a sample of fluid, the viscosity of which is being determined, will be uniformly agitated so that substantially uniform temperature will be maintained throughout the sample and the consistency of the sample throughout all portions thereof will be substantially uniform.

An important object of the invention is the provision of a unit for use in viscosity measuring apparatus whereby the viscosity of a fluid sample may be continuously determined over a relatively long period of time, during which a constant rate of shear is maintained.

It is a further object of the invention to provide a means for the continuous determination of the apparent viscosities of materials such as starch pastes during cooking and cooling of the same, at a constant rate of shear, and with a high degree of sensitivity and precision.

It is a further object of the invention to cook a material such as starch paste under automatically controlled conditions of agitation, rate of heating, and final temperature, and to so minimize the evaporation of water during cooking that the concentration of the paste will remain essentially unchanged over a long period.

It is a further object of this invention to provide means for the testing of starches in the lower range of concentrations of their industrial applications, as well as at higher concentrations, and to do this with adequate precision and accuracy for industrial testing.

Still another object of the invention is the provision of means for continuously determining the viscosities of materials such as starch paste in such a manner as to maintain an essentially uniform temperature throughout the sample and prevent the building up of adherent layers of pasted starch on the interior of the sample container, thereby promoting efficient and rapid transfer from the surrounding paste medium while maintaining the consistency of the sample substantially uniform throughout all parts thereof.

Other objects of the invention will, in part, be obvious and will in part appear hereinafter.

For a more complete understanding of the nature and scope of the invention, reference may now be had to the following detailed description thereof taken in connection with the accompanying drawing wherein the single figure is, in part, a vertical sectional view through a unit for use in viscosity measuring apparatus and forming the presently preferred embodiment of the invention, with certain associated pieces of apparatus being shown diagrammatically.

Referring now to the drawing, the reference numeral 10 designates, generally, a unit for use in viscosity measuring apparatus and constructed in accordance with the principles of the present invention. The unit 10 is shown in association with a torque meter or dynamometer 11 and a sample cup or container 12 supported in a water bath 13.

The water bath 13 is in the form of a tank 14 formed preferably of poor heat conducting material such as glass or stoneware, or suitably insulated metal. The tank 14 is supported on a table top or other support 15.

Water is generally used as the heating medium 16 in the tank 14, but other suitable liquids may be used. Water may be heated by an electrical heating element 17 having two terminals 18 and 20 extending through the bottom of the tank 14 in sealed insulated relationship therewith. The heating element may be thermostatically controlled whereby the temperature of the water may be regulated and controlled as desired.

The tank 14 is provided with an overflow connection 21 and a drain cock 22. A weir 23 is provided around the inner opening of the connection 21 for the purpose of maintaining a definite level of water within the tank 14. If it is desired to cool the water of the water bath 13, this may be accomplished by turning off the heater 17 and introducing cool water through the drain cock 22 while allowing it to flow over the weir 23 and out through the overflow connection 21.

The tank 14 is provided with a cover 24 having a central opening therein of relatively large diameter and defined by a collar 25 secured to the cover. The sample cup 12 has an outwardly flared lip 26 which rests on the top of the collar 25 so as to support the cup 12 within the water bath 13 as shown.

The container cup 12 may be in the form of a glass beaker or a metal cup. The beaker or container 12 is provided with a cover 27 having a central opening 28 therein to accommodate the unit 10 and having an annular shaped condenser ring 30 secured to the under side thereof. The cover 27 thus serves as an air condenser for water vapor evaporated from the contents of the container 12. The vapor condenses on the condenser ring 30 and drips back into the sample, thereby maintaining the water content thereof. It will be apparent that the cover 27 can be provided in a number of designs having effective condensing surfaces. For example, the cover 27 may be provided with connections 29—29 which may serve as inlet and outlet connections through which a coolant such as water or air may be circulated.

The unit 10 includes a scraper indicated generally at 31 disposed within the container 12 and carried on the lower end of a hollow shaft 32. A propeller or agitator 33 is located within the scraper 31 and is mounted on the lower end of a shaft 34 which fits within the hollow shaft 32.

The scraper 31 has a rectangular frame 35 having elongated end members 36—36. Scraper blades 37—37 are carried on the sides 36 so as to be movable relative thereto. The scraper blades 37 are secured to the frame ends 36 by means of ears 38 through which pins 39—39 from the opposite ends of the sides 36 project, as shown. The scraper blades 37 serve to scrape the side wall of the container 12 so as to remove films or deposits of the sample which may tend to build up thereon.

A bottom scraper blade 40 is supported between the bottom ends of the sides 36 by means of the pins 41—41. This bottom blade 40 serves to scrape the bottom of the container 12 and move the material toward the center thereof.

Both the scraper 31 and the propeller 33 serve to agitate the contents of the container 12 so as to maintain the contents uniformly mixed throughout.

A thermometer 42 carried by a stopper 43 fitting in an opening provided therefor in the cover 27 is used to measure the temperature of the contents of the container 12.

The shafts 32 and 34 are provided in upper and lower sections which are coupled together at the coupling 43. This arrangement permits the shafts to be disconnected at the coupling 43 so that the upper portion of the viscometer apparatus may be swung over the water bath 13, thereby permitting the container cup 12 to be removed from or placed in the water bath 13.

In order that the upper portion of the inner shaft 34 may be held stationary while the lower portion is connected or disconnected therefrom, a pair of pins 44—44 are provided which are normally spring retracted from the shaft 34 but which may be pressed together so as to hold it stationary.

The inner shaft 34 is supported within the hollow shaft 32 by upper and lower ball bearing units 45 and 46, respectively. The hollow shaft 34 is supported in the depending sleeve portion 47 of a housing 48 by upper and lower ball bearing units 50 and 51, respectively. The housing 48 may be supported on a post or other conventional support means, not shown.

The hollow shaft 32 is provided adjacent its upper end with a worm gear 52 rigidly secured thereto and disposed in driving relationship with a worm 53 journaled within the housing 48 on a support indicated by the reference numeral 54. The worm 53 is adapted to be driven at a constant speed by a synchronous motor indicated diagrammatically at 55 and interconnected in driving relationship with the worm 53 by a belt 56. It will be understood that instead of being connected with the synchronous motor 55, worm 53 may be connected with any other source of power and by any other means of transmission which will drive the worm at a uniform speed.

A bracket 57 is secured to the upper end of the hollow shaft 32 by means of a collar 58. The bracket 57 is provided with a set of ball bearings 60, 61 which support a vertical shaft 62 carrying a planet wheel or gear 63 on the upper end thereof.

The planet wheel 63 intermeshes with a sun wheel or gear 64 carried on the lower end of a vertical shaft 65 supported in a bearing 66 carried in the housing 48. A drum 67 is secured to the upper end of the shaft 65 and this drum is connected by a cable 68 with a torque meter or dynamometer 11.

The torque meter 11 may be either an indicating type of meter of known type or a recording type of meter of known type. Preferably, the torque meter 11 is of the type having a quadrant balance, provided with a series of easily interchangeable auxiliary weights. The auxiliary weights may be interchanged without necessitating recalibration of the dynamometer thereby greatly extending the range of the torque meter 11. Weights may be interchanged before starting a test or during a test without interrupting it.

Torque meters of the type including a quadrant balance, both of the recording and indicating type, are known and available.

The torque meter 11 serves to prevent the drum 67 and the sun wheel 64 from rotating, and in so doing measures the torque required to hold the sun wheel 64 from turning.

A gear wheel 70 is carried on the shaft 62 underneath the planet wheel 63. The gear 70 intermeshes with a gear 71 carried on the upper end of the inner shaft 34.

It will be apparent that the gear wheels 63, 64, 70 and 71 together constitute a sun and planet differential unit.

In operation, the viscosity measuring apparatus shown in the drawing operates in the following manner:

The water bath 13 is filled with water and preheated to the desired testing temperature by means of the thermostatically controlled heating element 17. A sample of material such as starch paste is then put in the container 12 and the scraper 31 and propeller 33 are inserted therein. The cover 27 is then placed on the container 12 and the upper and lower sections of the shafts 32 and 34 are connected together. When the test is ready to be started, the motor 55 is started and through the worm 53 and worm gear 52, the motor rotates the shaft 32, and thereby the scraper 31 at a constant speed. As the outer shaft 32 is rotated, the bracket 57 which supports the plant wheel 63 is carried around therewith. Since the sun wheel 64 is held against rotation by the torque meter 11, the planet wheel 63 and gear wheel 70 are caused to rotate about their principal axes. Gear wheel 70 thereby drives the gear wheel 71 at a constant speed which in turn drives the propeller 33 at a constant speed through the shaft 34.

It will be apparent that the torque reaction on the sun wheel 64, which reaction is measured or recorded by the dynamometer 11, is directly proportional to and only to, the reaction against rotation encountered by the propeller 33. Since the latter is rotated at a constant speed, the viscosity of the contents of the sample cup 12 is measured at a constant rate of shear throughout a test.

The agitator 31 and propeller 33 together keep the sample in the cup 12 uniformly mixed throughout with respect to temperature and consistency. Films or deposits are not allowed to form on the interior of the cup 12, thereby maintaining an efficient heat transfer relationship with the water bath 13.

Viscosity determinations of extended range and scope may be accurately replicated with the viscosity apparatus of the invention. The testing conditions may be widely varied in accordance with particular requirements.

Since a number of modifications may be made in the foregoing construction and different embodiments of the invention may be made without departing from the scope thereof, it is intended that all matter shown in the accompanying drawing or described hereinbefore shall be interpreted as illustrative, and not in a limiting sense.

What is claimed as new is:

1. A unit for use in viscosity measuring apparatus, which unit comprises, in combination, a rotatable scraper adapted to scrape the interior surface of a container adapted to hold material for measurement of its viscosity, a first shaft secured to said scraper and rotatable coaxially therewith, a rotor rotatable within said scraper, a second shaft secured to said rotor and rotatable coaxially therewith, rotatable torque transmitting means on said first shaft whereby it may be connected in driving relationship with a constant speed motor, a sun and planet differential, bearing means supporting the planet element of said differential on the side of said first shaft whereby said planet element is carried around with said first shaft and with respect thereto is free to rotate about its own principal axis, and driving means interconnecting said planet element in driving relationship with said second shaft, the sun element of said differential being adapted to be held against rotation by a torque meter with the torque required to so hold said sun element being directly proportional to the frictional resistance against rotation encountered by said rotor.

2. A unit for use in viscosity measuring apparatus, said unit comprising, in combination, a rotatable scraper adapted to scrape the interior surface of a container adapted to hold material for measurement of its viscosity, an agitator rotatable within said scraper, an outer tubular shaft having another shaft disposed therewithin for co-axial rotation therewith, means securing said scraper to one of said shafts for rotation therewith, means securing said agitator to the other of said shafts for rotation therewith, rotatable torque transmitting means on said scraper-carrying shaft whereby this shaft may be connected in driving relationship with a constant speed motor, a sun and planet differential, bearing means supporting the planet element of said differential on the side of said scraper-carrying shaft whereby said planet is carried around therewith and with respect thereto is free to rotate about its own principal axis, and driving means interconnecting said planet element in driving relationship with said agitator-carrying shaft, the sun element of said differential being adapted to be held against rotation by a torque meter with the torque required to so hold said sun element being directly proportional to the frictional resistance against rotation encountered by said agitator.

3. A unit for use in viscosity measuring apparatus including a sample cup and a dynamometer, said unit comprising, in combination, a rotatable scraper adapted to scrape the sides and bottom of said sample cup, a propeller rotatable within said scraper, a hollow shaft secured to said scraper and rotatable coaxially therewith, a shaft rotatable within said hollow shaft and secured to said propeller and rotatable coaxially therewith, rotatable torque transmitting means mounted on said hollow shaft whereby it may be connected in driving relationship with a constant speed motor, a sun and planet differential, bearing means supporting the planet element of said differential on the side of said hollow shaft whereby said planet element is carried around with said hollow shaft and with respect thereto is free to rotate about its own principal axis, and gear means interconnecting said planet element in driving relationship with said inner shaft, the sun element of said differential being adapted to be connected with said dynamometer and held against rotation thereby with the torque required to so hold said sun element from turning being directly proportional to the frictional resistance against rotation encountered by said rotor.

4. The unit called for in claim 3 wherein each of said shafts is provided in sections adapted to be coupled together and uncoupled as desired.

5. Viscosity measuring apparatus, comprising, in combination, a thermostatically controlled water bath, a sample cup supported in said bath, a condenser cover on said cup, a rotatable scraper adapted to scrape the side wall and bottom of said cup, a propeller rotatable within said scraper, a hollow shaft secured to said scraper and rotatable coaxially therewith, a shaft rotatable within said hollow shaft and secured to said propeller and rotatable coaxially therewith, a synchronous motor, a worm and worm gear combination interconnecting said hollow shaft in driving relationship with said synchronous motor, a sun and planet differential, bearing means supporting the planet wheel of said differential on the side of said hollow shaft whereby said planet wheel is carried around therewith and with respect thereto is free to rotate about its own principal axis, gear wheel means interconnecting said planet wheel in driving relationship with said propeller-carrying shaft, a drum wheel carried with the sun wheel of said differential, a dynamometer, and a cable interconnecting said drum wheel with said dynamometer whereby the latter holds said drum and sun wheel from turning and thereby measures the frictional resistance against rotation encountered by said propeller.

WELKER G. BECHTEL.
CARL C. KESLER.

REFERENCES CITED

The following references are of record in the file of this patent:

UNITED STATES PATENTS

| Number | Name | Date |
| --- | --- | --- |
| 1,334,856 | Hayes et al. | Mar. 23, 1920 |
| 1,836,995 | Stickney | Dec. 15, 1931 |